(12) United States Patent
Al-Otaibi

(10) Patent No.: US 8,967,234 B2
(45) Date of Patent: Mar. 3, 2015

(54) TUBE PLUG FOR A HEAT EXCHANGER TUBE

(75) Inventor: Dhawi A. Al-Otaibi, Jalawaih (SA)

(73) Assignee: Saudi Arabian Oil Company, Dhahran (SA)

( * ) Notice: Subject to any disclaimer, the term of this patent is extended or adjusted under 35 U.S.C. 154(b) by 1011 days.

(21) Appl. No.: 12/946,031

(22) Filed: Nov. 15, 2010

(65) Prior Publication Data

US 2012/0118547 A1    May 17, 2012

(51) Int. Cl.
    *F16F 1/34*      (2006.01)
    *F28F 11/02*      (2006.01)
    *F16L 55/11*      (2006.01)
    *F28F 1/10*      (2006.01)

(52) U.S. Cl.
    CPC ............. *F28F 11/02* (2013.01); *F16L 55/1141* (2013.01)
    USPC ................................ 165/71; 165/172; 138/89

(58) Field of Classification Search
    CPC ..... F16L 55/128; F16L 55/612; F16L 55/136; F16L 55/163; F16L 55/1645; F16L 55/13; F16L 55/1612; F28G 1/14; F28G 1/10
    USPC ............. 165/158, 172, 71, 72, 76, 95; 138/89
    See application file for complete search history.

(56) References Cited

U.S. PATENT DOCUMENTS

| | | | |
|---|---|---|---|
| 1,997,878 A * | 4/1935 | Wagner | 220/284 |
| 2,756,779 A * | 7/1956 | Tratzik et al. | 138/97 |
| 3,724,062 A | 4/1973 | Cantrell et al. | |
| 3,785,291 A | 1/1974 | Bergbauer et al. | |
| 3,919,940 A | 11/1975 | Ploger et al. | |
| 4,114,654 A | 9/1978 | Richardson | |
| 4,310,182 A * | 1/1982 | Vandenbossche | 285/40 |
| 4,425,943 A | 1/1984 | Martin | |
| 4,425,944 A | 1/1984 | Heuckelbach et al. | |
| 4,428,359 A * | 1/1984 | Scarselletta | 126/588 |
| 4,646,816 A | 3/1987 | Rothstein | |
| 5,167,064 A | 12/1992 | Sutor, IV | |
| 5,289,851 A | 3/1994 | Jorgensen | |
| 5,437,310 A | 8/1995 | Cunningham | |
| 5,456,290 A * | 10/1995 | Haberman et al. | 138/89 |
| 5,479,961 A | 1/1996 | DeMarsh et al. | |
| 5,816,292 A | 10/1998 | Wilson et al. | |
| 6,170,530 B1 | 1/2001 | Steblina | |
| 6,494,463 B1 | 12/2002 | Rank | |
| 6,499,511 B2 * | 12/2002 | Brewis | 138/89 |
| 6,832,624 B1 * | 12/2004 | Rippolone | 137/317 |
| 6,877,529 B2 * | 4/2005 | Bernini | 138/89 |
| 6,883,547 B1 | 4/2005 | Jorgensen | |
| 6,920,844 B1 * | 7/2005 | Ismert | 122/14.3 |
| 7,314,065 B1 | 1/2008 | Adelman | |
| 7,389,798 B2 | 6/2008 | Nowling et al. | |
| 2009/0095211 A1 | 4/2009 | Johns et al. | |

OTHER PUBLICATIONS

International Search Report and Written Opinion, Mar. 8, 2012.

* cited by examiner

*Primary Examiner* — Tho V Duong
(74) *Attorney, Agent, or Firm* — Abelman, Frayne & Schwab

(57) ABSTRACT

A tube plug adapted to be driven into and then plug an open end of a heat exchange tube that extends transversely through and is secured in a tubesheet of a heat exchanger, where the tube plug includes an elongated shaft having a lead part adapted to be introduced into the open end of the heat exchange tube and an opposite rear part, and a fluid seal situated on the lead part, the seal including a set of lead and rear ring flanges fixed to the lead part, extending radially outward therefrom, and axially spaced apart from each other, and a compressible and resilient ring-shaped gasket adapted to encircle the lead part of the shaft when situated axially between the ring flanges.

16 Claims, 4 Drawing Sheets

TUBE PLUG FOR A HEAT EXCHANGER TUBE

A. BACKGROUND

1. Field of the Invention

This invention is in the field of fluid flow heat exchangers in which potentially corrosive fluid flows through heat exchange tubes whose ends extend through and are secured to tubesheets. This invention pertains particularly to tube plugs for plugging the open ends of damaged heat exchange tubes.

2. Discussion of the Prior Art

In connection with leaking heat exchanger tubes, plugging damaged and leaking heat exchange tubes is the most common method of taking the tubes out of service. This is normally done by inserting a conventional one or two-piece tapered plug into the end of a damaged heat exchange tube.

A plugged tube may become filled with shell side fluid that becomes stagnant in the annular space between the outer surface of the plug and the inner surface of the tube, especially at the six o'clock or bottom dead center position. Such stagnant fluid can cause severe corrosion to the internal surface of the tube, and such corrosion can eventually penetrate to the tubesheet and cause severe damage to the tubesheet.

Figure 1:
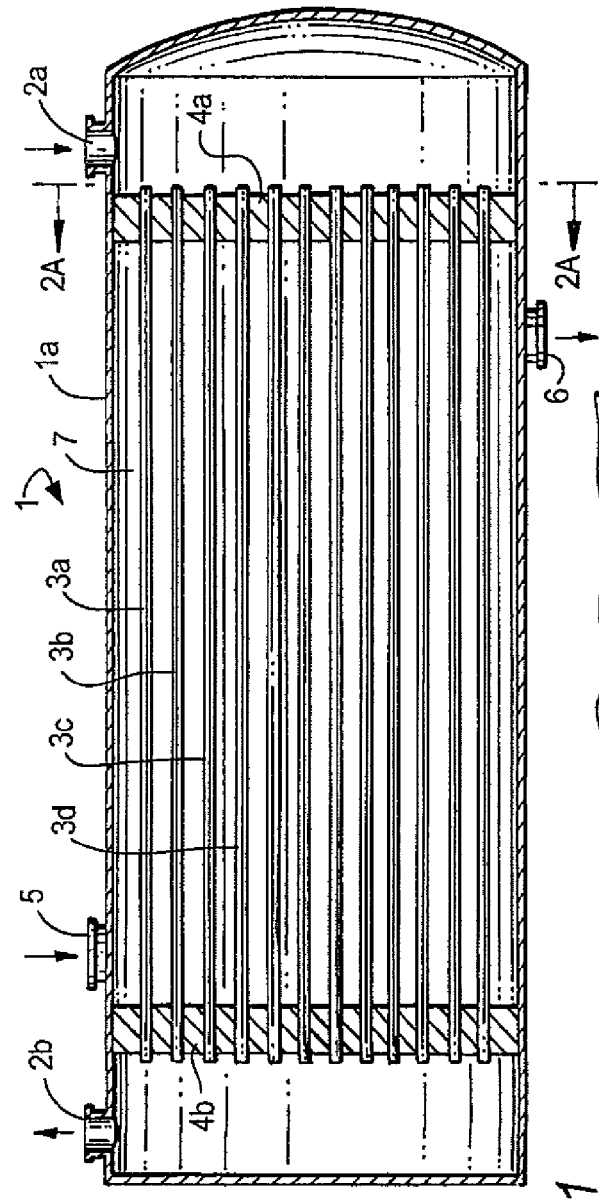
Figure 3:
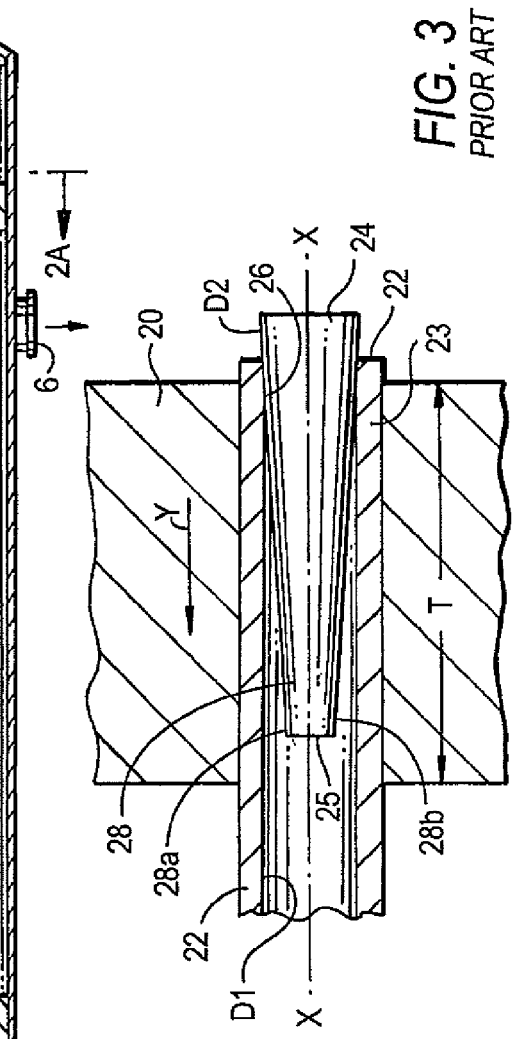
Figure 2A:
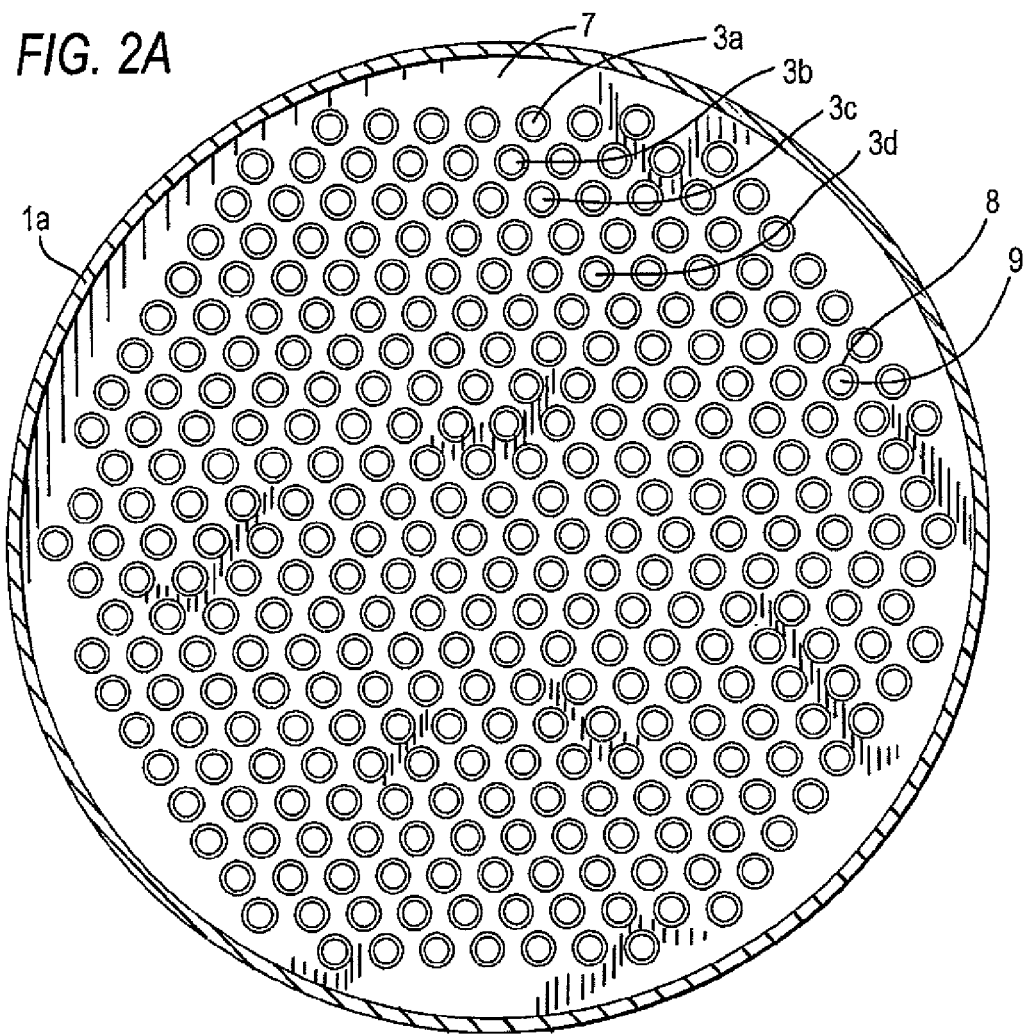
Figure 2B:
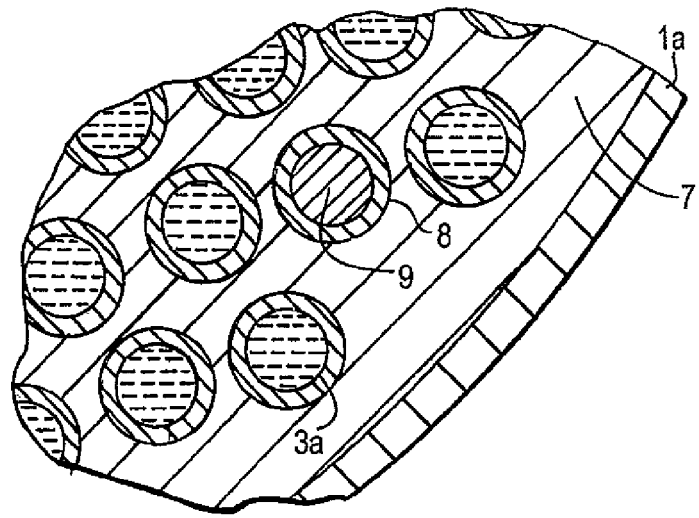

A conventional fluid heat exchanger 1 is illustrated in FIGS. 1, 2A and 2B showing tubesheets 4A, 4B and heat exchange tubes 3a, 3b, 3c and 3d with their ends secured in tubesheets 4A, 4B by conventional hydraulic expansion, seal welding or other means. FIG. 3 shows how a tube damaged from cracks, pin holes or other issues can be taken out of service using a prior art one-piece tapered plug 24. Such plugs are commonly used in the petroleum and petrochemical industries due to the ease of fabrication and installation. This tube plug action is normally taken when it is not practical, due to production cost impact, to take the entire heat exchanger out of service in order to replace damaged tubes. Sealing of such a heat exchange tube and tube plug connection is achieved by the friction fit between the plug and the internal or bore surface of the tube.

B. OBJECTS AND SUMMARY OF THE NEW INVENTION

A principal objective of the improved tube plug of this invention is to protect the tubesheet from severe corrosion caused by stagnant fluid that may accumulate after plugging a tube. This is achieved by providing a new tube plug design with a seal sub-assembly formed of a sealing gasket situated axially between two adjacent ring flanges extending radially outward from the plug. In a preferred embodiment these rings flanges are formed of or machined from the same material as the plug and are an integral part of the plug. The gasket is a resilient compressible ring situated axially between these two rings which restrict the gasket from axial displacement, while also supporting said gasket to remain in sealing contact with the bore surface of the tube. The seal assembly isolates a damaged tube from service, and is positioned axially inward of the interior face of the tubesheet to bar fluid accumulation in the tube in the vicinity of the tubesheet.

It is therefore a principal object of this invention to provide an improved tube plug that will both isolate the defective or damaged tube and protect the tubesheet to which it is attached from severe corrosion caused by stagnant fluid after the tube is plugged.

Another object is to provide a tube plug formed as an elongated shaft having a rear part situated in the heat exchange tube where it traverses the tubesheet, and a lead part that extends axially and inwardly beyond the rear part to an axial location inward of the tubesheet.

A further object is to provide a tube plug as defined above whose lead part includes an elastic and resilient sealing ring or gasket for tightly engaging the bore surface of the heat exchange tube at an axial location inward of the tubesheet, and where axial movement or expansion of said sealing ring is at least partially restricted by a set of axially spaced apart proximal and distal flanges extending radially on said shaft and between which said sealing ring is axially situated.

An additional object is for the tube plug as defined above to have its shaft and radially extending ring flanges formed as a single contiguous element, or more particularly, to have the ring flanges machined from the material of the tube plug shaft.

A further object is for the tube plug as defined above to be tapered at least along the length of its rear part for producing a tight interference fit when driven into said proximal end of said heat exchange tube.

Another object is to provide an effective tube plug that can be made easily, quickly, and economically.

The invention herein includes the various embodiments:
- a—a tube plug for use in a heat transfer tube,
- b—a heat transfer tube and tube plug combination,
- c—a heat exchanger with a plurality of heat exchange tubes and at least one tube plug in at least one of said tubes, and
- d—a method of plugging a heat exchange tube which is fixed in a heat exchanger using one of the tube plugs defined herein.

In one embodiment the tube plug comprises a tube plug adapted to be driven into and then plug an open end of a heat exchange tube that extends transversely through and is secured in a tubesheet of a heat exchanger, where said heat exchange tube has bore diameter D1, said tube plug comprising:
- a. an elongated shaft having a lead part adapted to be introduced into said open end of said heat exchange tube and an opposite rear part, and
- b. a fluid seal situated on said lead part, said seal comprising:
  - (1) a set of lead and rear ring flanges fixed to said lead part, extending radially outward therefrom, and axially spaced apart from each other, said ring flanges each having outer diameter less than D1, and
  - (2) a compressible and resilient ring-shaped gasket adapted to encircle said lead part of said shaft when situated axially between said ring flanges, said gasket having a relaxed outer diameter greater than D1 and a compressed outer diameter essentially equal to D1 when said plug with said seal is inserted and driven into said open end of said tube having bore diameter of D1, at which time said lead and rear flanges restrict axial deformation and displacement of said gasket as it is radially compressed when it is driven axially into the bore of said heat exchange tube.

Another embodiment is an assembled heat exchanger including at least one tube plug as described above where said heat exchanger comprises:
- a. an elongated shell,
- b. a set of axially spaced apart tubesheets situated in said shell with inner wall surfaces of said tubesheets defining opposite ends of a heat exchange space which includes inlet and outlet ducts for fluid flow through said space, each of said tubesheets having opposite inner and outer surfaces defining the thickness therebetween of said tubesheet, and
- c. a plurality of elongated heat exchange tubes extending between said tubesheets with opposite ends of said tubes extending through, and fixed and fluid sealed to said tubesheets respectively, said shell having further inlet and outlet ducts for fluid to flow through said tubes, said tube plug lead end first being driven into and plugging the open end of at least one of said heat exchange tubes, where said lead part of said tube plug has said seal gasket thereof situated axially inward of said inner wall surface of said tubesheet.

A further embodiment is a tube plug as described above where the gasket and shaft comprise an assembly as opposed to a tube plug adapted to receive a gasket.

A still further embodiment is a fluid heat exchanger according to the prior embodiment where said gasket comprises an elastomeric material selected from the group consisting of ethylene-propylene and silicon based materials. Other suitable materials will be apparent to one of ordinary skill in the art based upon their compatibility with the shell side fluid.

An additional embodiment is a method of plugging an open end of a heat exchange tube with a tube plug in a heat exchanger as described above, where said tubesheet has an inner wall surface facing the interior of said heat exchanger, and said tube being plugged extends through and is fixed in fluid tight relationship to said tubesheet, comprising the steps:
  a. inserting said tube plug by its lead part first into the open send of said tube,
  b. moving said tube plug axially in the lead part direction until said gasket of said seal is axially inward of said shell side of said tube sheet, and
  c. securing said rear part of said tube plug tightly in said bore of said tube.

These and additional objects, advantages, features and benefits of the present invention will become apparent from the following specifications.

C. BRIEF DESCRIPTION OF THE DRAWINGS

Figure 4:
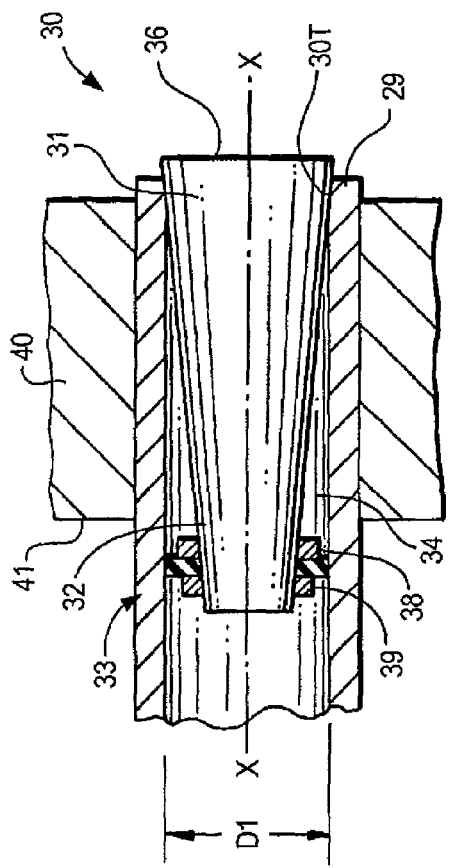
Figure 5:
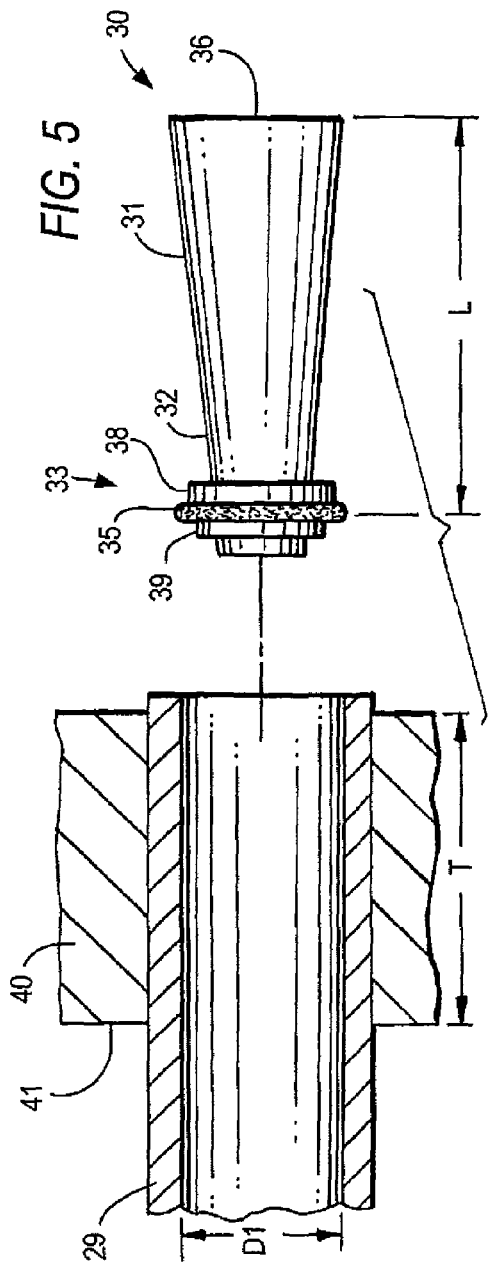
Figure 6A:
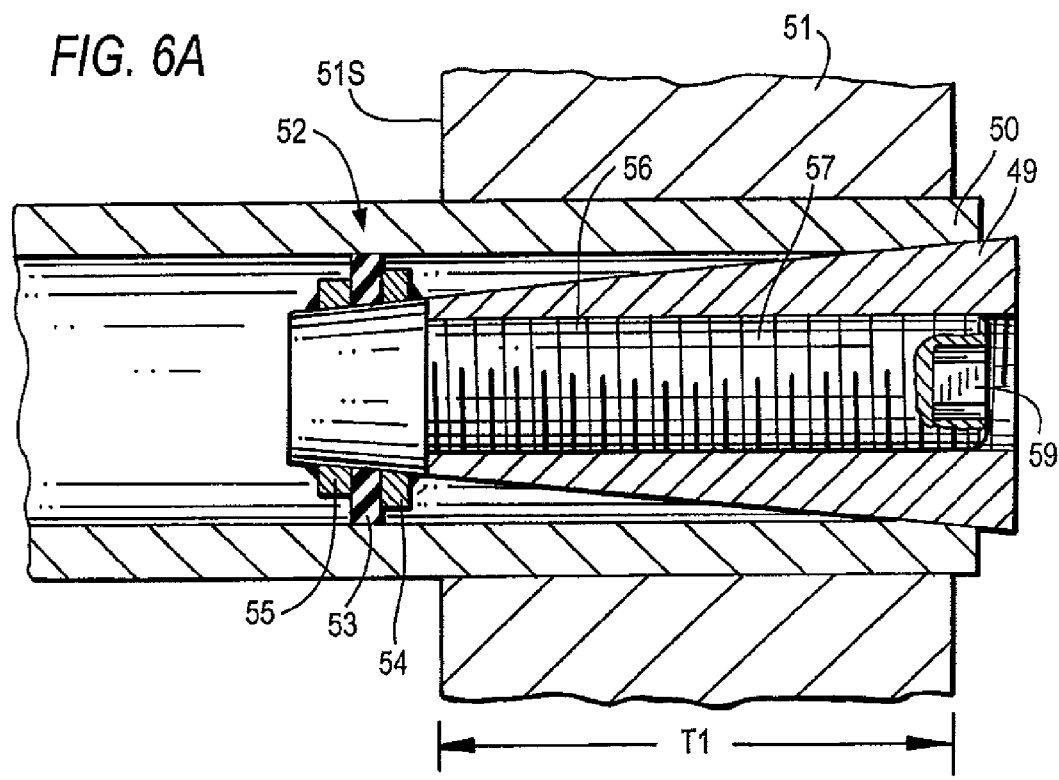
Figure 6B:
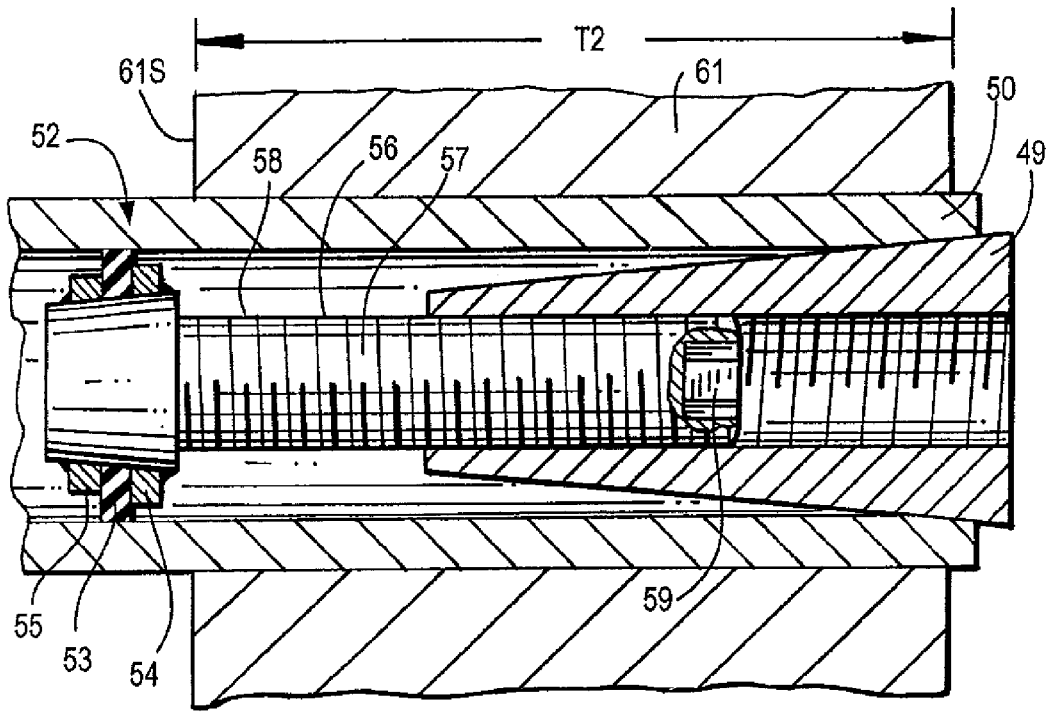

FIG. 1 is a side elevation view of a conventional heat exchanger,

FIG. 2A is an elevation view in section taken along lines 2A-2A in FIG. 1 showing an outer surface of the tubesheet where the ends of representative heat exchange tubes are shown as circles, FIG. 2B is an enlarged fragmentary view taken from FIG. 2A showing the ends of the representative heat exchange tubes, FIG. 3 is a fragmentary side elevation view in section of a prior art tube plug in a heat exchange tube extending through a tubesheet, FIG. 4 is a fragmentary side elevation view in section of the new tube plug in a heat exchange tube extending through a tubesheet, FIG. 5 is similar to FIG. 4 showing the new tube plug positioned for entry into a heat exchange tube, FIG. 6A is a fragmentary elevation view in section of a second embodiment of the new to plug in its unextended state, and FIG. 6B is a view similar to FIG. 6A showing the new tube plug in its extended state.

D. DETAILED DESCRIPTION OF THE PREFERRED EMBODIMENTS

FIG. 1 shows a heat exchanger 1 including its shell 1a containing a plurality of generally parallel heat exchange tubes 3a, 3b, 3c, 3d extending axially between inlet 2a and outlet 2b. Each tube has its proximal end extending through and fixed to tubesheet 4A, and its distal end extending through and fixed to tubesheet 4B. Shell 2 has additional inlet 5 and outlet 6 for fluid in heat exchange chamber 7.

FIG. 2A shows the end face of the tubesheet 4A with its large number of transverse holes. In each hole is tightly secured by conventional means, the proximal end of one heat exchanger tube, with four representative tubes 3a-3d so labeled. Tube 8 is shown with a tube plug 9 secured in its open end. FIG. 2B is an enlarged fragmentary view of the tubesheet of FIG. 2A showing ends of the representative heat exchange tubes, exemplified by tubes 3a and 8.

Representing a prior art heat exchanger and tube plug, FIG. 3 shows in fragmentary side elevation sectional view a segment of a tubesheet 20 of thickness T, a single representative heat exchange tube 22 having central longitudinal axis X-X, and a conventional tube plug 24 in the proximal end 23 of tube 22. Tube 22's proximal end 23 extends transversely through tubesheet 20 and is fixed thereto by conventional means such as hydraulic expansion and/or welding. Tube 22 extends axially inward of tubesheet 20 in the distal direction indicated by arrow Y. Tube plug 24 is tapered to produce a tight interference or friction fit in the general area 26 where the tube plug's outer diameter D2 is greater than bore diameter D1 of heat exchange tube 22. The remaining tapered portion of plug 24 extending to its distal end 25 produces annular space 28 encircling the distal end 25 of plug 24. Annular area 28, while it surrounds the distal end of plug 24, is simultaneously adjacent a substantial portion of tube 22 where its proximal end is within tubesheet 20 which has thickness T. With respect to a horizontal orientation, annular space 28 has portion 28A in the 12 o'clock region and portion 28B in the 6 o'clock region of the annular space 28.

In the prior art it is in this space 28 where stagnant fluid may accumulate in a plugged tube, particularly in the 6 o'clock region and cause corrosion which can not only damage this proximal end 23 of tube 22, but can corrode the adjacent wall material of tubesheet 20. Damage to said tubesheet can lead to far greater malfunction of the heat exchanger and danger and expense than mere damage to a single heat exchange tube.

FIGS. 4 and 5 illustrate the new tube plug 30 of the present invention in tube 29, the tube plug having a proximal or rear part 31 and distal or lead part 32, with fluid seal sub-assembly 33 positioned on the lead part 32 sufficiently far in the lead direction to be axially inward of inner wall surface 41 of tubesheet 40 when tube plug 30 is installed as seen in FIG. 4. With this arrangement the annular area or zone 34 that is axially inward of fluid seal 33 will be free or at least substantially free of any stagnant fluid that could be in tube 29.

In this embodiment of the new tube plug 30, its rear part 31 shall be deemed the portion extending from proximal end 36 distally a distance L to said seal 33. The tube plug's rear part has length L that is generally greater than thickness T of tubesheet 40, or at least great enough to position seal 33 axially inward of tubesheet 40 (see FIG. 4) when plug 30 is driven into the open end of tube 29. Consequently, any corrosive fluid in tube 29 will be restricted to an area distally of seal 33 and thus distal of tubesheet 40.

Seal 33 is established by resilient and compressible gasket 35 with proximal or rear ring flange 38 and distal or lead ring flange 39 situated on adjacent opposite sides of gasket 35 to fix gasket 35's axial location and support it from excessive axial deformation or displacement when tube plug 30 is driven axially into the open end of tube 42.

As seen in FIG. 4, ring flanges 38, 39 have diameters less than D1, the bore diameter of tube 29. Gasket 35 has a relaxed state seen in FIG. 5 where its outer diameter is greater than bore diameter D1, and a compressed state as seen in FIG. 4 where its outer diameter is obviously the same as D1 and is tightly compressed against this bore surface.

In the tube plug embodiment shown in FIG. 4 the rear ring flange 38 has outer diameter that is slightly greater than the outer diameter of distal ring flange 39; however, both have diameters less than bore diameter D1 of tube 29, so that tube plug 30 can be freely inserted into tube 42. The diameters of these flanges could be the same or different from each other.

In FIG. 4 the taper at region 30T of the rear end of tube plug 30 will be dimensioned to correspond to and develop a reliable interference fit with the bore of the tube into which it will be driven.

One exemplary embodiment of the new tube plug has dimensions listed below, where the heat exchanger tube has bore diameter 0.584 inches, the tubesheet has thickness of about two inches, and
 a—total length of the tube plug is four inches,
 b—outer diameter of the gasket in relaxed state is 0.702 inches
 c—outer diameter of the rear flange of is 0.505 inches
 d—thickness of the rear flange is 0.125 inches,
 e—outer diameter of the lead flange is 0.427 inches, and
 f—thickness of the lead flange is 0.125 inches.

Tube plug 30 is made of a metal such as carbon steel or other material resistant to corrosion from petroleum fluid. Gasket 35 is preferably formed from a resilient elastic plastic material, examples being ethylene-propylene and silicon based materials.

FIGS. 6A, 6B show a second embodiment 49 of the new tube plug situated in the proximal end of tube 50 which extends through tubesheet 51. The lead portion of tube plug 49 and its seal subassembly 52 comprising resilient gasket 53 and supporting ring flanges 54 and 55, are generally similar to tube plug 30 of FIGS. 4 and 5. In FIG. 6A the tubesheet 51 has thickness T1 and tube plug 49 has length sufficient to position seal 52 distally inward of the inner wall surface 51S of tubesheet 51. Tube plug 49 includes a central screw element 56 that will be described below.

FIG. 6B shows the tube plug 49 of FIG. 6A, but in a different tubesheet 61 of substantially greater thickness T2; however, central screw element 56 has been rotated via screw threads 57, such that its lead end 58 has moved distally a distance sufficient to position seal 52 distally inward of the inner wall surface 61S of thicker tubesheet 61. As seen in FIGS. 6A and 6B, tube plug 49 has a hex or other recess 59 in its rear end which can be engaged by a hex or other appropriate driver to rotate plug 49 a desired distance to position seal 52 inward of tubesheet 61. This tube plug with its axially adjustable seal is thus usable with tube sheets of different thicknesses, or with tubes in a particular tube sheet where the corrosive or other damage in different tubes is at different distances from the proximal ends of said tubes.

While the invention has been described in conjunction with several embodiments, it is to be understood that many alternatives, modifications and variations will be apparent to those skilled in the art in light of the foregoing description. Accordingly, this invention is intended to embrace all such alternatives, modifications, and variations which fall within the spirit and scope of the appended claims.

The invention claimed is:

1. A tube plug adapted to be driven into and then plug an open end of a heat exchange tube that extends transversely through and is secured in a tubesheet of a heat exchanger, where said heat exchange tube has bore diameter D1, said tube plug comprising:
 a. an elongated shaft having a lead part adapted to be introduced into said open end of said heat exchange tube and an opposite rear part, and
 b. a fluid seal situated on said lead part, said seal comprising:
  i. a set of lead and rear ring flanges fixed to said lead part, extending radially outward therefrom, and axially spaced apart from each other, said ring flanges each having outer diameter less than D1, and
  ii. a compressible and resilient ring-shaped gasket encircling said lead part of said shaft when situated axially between said ring flanges,
 said gasket having a relaxed outer diameter greater than D1 and a compressed outer diameter essentially equal to D1 when said plug with said seal is inserted and driven into said open end of said tube having bore diameter of D1, at which time said lead and rear flanges restrict axial deformation and displacement of said gasket as it is radially compressed when it is driven axially into the bore of said heat exchange tube,
where said rear part comprises an axial segment tapered from larger to smaller diameter in the rear-to-lead direction, said segment's smaller diameter being less than D1 and its larger diameter being larger than D1, so that said segment can develop a tight fit when driven into said tube bore.

2. The tube plug according to claim 1 wherein said shaft is tapered along its full length from rear to lead parts.

3. The tube plug according to claim 1 where said rear ring flange has outer diameter greater than the outer diameter of said lead ring flange.

4. The tube plug according to claim 1 where said shaft and ring flanges are machined from the material forming said shaft.

5. The tube plug according to claim 1 where said gasket comprises a material selected from the group consisting of ethylene-propylene and silicon based materials.

6. A fluid heat exchanger comprising:
 a. an elongated shell,
 b. a set of axially spaced apart tubesheets situated in said shell with inner wall surfaces of said tubesheets defining opposite ends of a heat exchange space which includes inlet and outlet ducts for fluid flow through said space, each of said tubesheets having opposite inner and outer surfaces defining the thickness therebetween of said tubesheet,
 c. a plurality of elongated heat exchange tubes extending between said tubesheets with opposite ends of said tubes extending through, and fixed and fluid sealed to said tube sheets respectively, said shell having further inlet and outlet ducts for fluid to flow through said tubes, and
 d. a tube plug adapted to be driven into and then plug an open end of a heat exchange tube that extends transversely through and is secured in a tubesheet of a heat exchanger, where said heat exchange tube has bore diameter D1, said tube plug comprising:
  1. an elongated shaft having a central longitudinal axis, a lead part adapted to be introduced into said open end of said heat exchange tube and an opposite rear part, and
  2. a fluid seal situated on said lead part, said seal comprising:
   ii. a set of lead and rear ring flanges fixed to said lead part, extending radially outward therefrom, and axially spaced apart from each other, said ring flanges each having outer diameter less than D1, and ii. a compressible and resilient ring-shaped gasket encircling said lead part of said shaft when situated axially between said ring flanges, said gasket having a relaxed outer diameter greater than D1 and a compressed outer diameter essentially equal to D1 when said plug with said seal is inserted and driven into said open end of said tube having bore diameter of D1, at which time said lead and rear flanges restrict axial deformation and displacement of said gasket as it is radially compressed when it is driven axially into the bore of said heat exchange tube, said tube plug lead end first being driven into and plugging the open end of at least one of said heat exchange tubes, where said lead part of said tube .plug has said seal gasket thereof situated axially inward of said inner wall surface of said tubesheet.

7. The fluid heat exchanger according to claim 6 wherein said rear part comprises an axial segment tapered from larger to smaller diameter in the rear-to-lead direction, said segment's smaller diameter being less than D1 and its larger diameter being larger than D1, so that said segment can develop a tight fit when driven into said tube bore.

8. The fluid heat exchanger according to claim 6 wherein said shaft is tapered along its full length from rear to lead parts.

9. The fluid heat exchanger according to claim 6 where said rear ring flange has outer diameter greater than the outer diameter of said lead ring flange.

10. The fluid heat exchanger according to claim 6 where said gasket comprises a material selected from the group consisting of ethylene-propylene and silicon based materials.

11. A method with a heat exchanger that includes a plurality of heat exchange tubes extending between a set of tubesheets and where said tube sheets whose inner wall surfaces define between them a heat exchange chamber, of plugging an open end of one of said heat exchange tubes with a tube plug, comprising:
1. an elongated shaft having a central longitudinal axis, a lead part adapted to be introduced into said open end of said heat exchange tube and an opposite rear part, and
2. a fluid seal situated on said lead part, said seal comprising:
   iii. a set of lead and rear ring flanges fixed to said lead part, extending radially outward therefrom, and axially spaced apart from each other, said ring flanges each having outer diameter less than D1, and
   ii. a compressible and resilient ring-shaped gasket encircling said lead part of said shaft when situated axially between said ring flanges, said gasket having a relaxed outer diameter greater than D1 and a compressed outer diameter essentially equal to D1 when said plug with said seal is inserted and driven into said open end of said tube having bore diameter of D1, at which time said lead and rear flanges restrict axial deformation and displacement of said gasket as it is radially compressed when it is driven axially into the bore of said heat exchange tube, comprising the steps:
a. inserting said tube plug by its lead part first into the open end of said tube,
b. moving said tube plug axially in the lead part direction until said gasket of said seal is axially inward of inner wall surface of said tube sheet, and
c. securing said rear part of said tube plug tightly in said bore of said tube.

12. The method according to claim 11 where said rear part comprises an axial segment tapered from larger to smaller diameter in the rear-to-lead direction, said segment's smaller diameter being less than D1 and its larger diameter being larger than D1, so that said segment can develop a tight fit when driven into said tube bore.

13. The method according to claim 11 where said shaft is tapered along its full length from rear to lead parts.

14. The method according to claim 11 where said rear ring flange has outer diameter greater than the outer diameter of said lead ring flange.

15. The method according to claim 11 where said shaft and ring flanges are machined from the material forming said shaft.

16. A method with a heat exchanger that includes a plurality of heat exchange tubes extending between a set of tubesheets and where said tube sheets whose inner wall surfaces define between them a heat exchange chamber, of plugging an open end of one of said heat exchange tubes that has bore diameter D1, with a tube plug, comprising the steps:
a. providing a tube plug having:
   (i) an elongated shaft having a central longitudinal axis, a lead part adapted to be introduced into said open end of said heat exchange tube and an opposite rear part, and
   (ii) a fluid seal situated on said lead part, said seal comprising:
      (1) a set of lead and rear ring flanges fixed to said lead part, extending radially outward therefrom, and axially spaced apart from each other, said ring flanges each having outer diameter less than D1, and
      (2) a compressible and resilient ring-shaped gasket encircling said lead part of said shaft when situated axially between and adjacent to said ring flanges for supporting said gasket from deflection in the direction of said central longitudinal axis, said gasket having a relaxed outer diameter greater than D1 and a compressed outer diameter essentially equal to D1 when said plug with said seal is inserted and driven into said open end of said tube having bore diameter of D1, at which time said lead and rear flanges restrict axial deformation and displacement of said gasket as it is radially compressed when it is driven axially into the bore of said heat exchange tube,
b. inserting said tube plug by its lead part first into the open end of said tube,
c. moving said tube plug axially in the lead part direction until said gasket of said seal is axially inward of inner wall surface of said tube sheet, and
d. securing said rear part of said tube plug tightly in said bore of said tube.

* * * * *